United States Patent [19]

Ishida

[11] 4,056,900
[45] Nov. 8, 1977

[54] CAM MACHINING APPARATUS

[75] Inventor: Takashi Ishida, Nagoya, Japan

[73] Assignee: Okuma Machinery Works Ltd., Nagoya, Japan

[21] Appl. No.: 645,221

[22] Filed: Dec. 29, 1975

[30] Foreign Application Priority Data

Dec. 28, 1974 Japan ............................ 50-1413
Oct. 24, 1975 Japan ............................ 50-128693

[51] Int. Cl.² .................. B24B 5/06; B24B 17/00
[52] U.S. Cl. ................................ 51/33 W; 51/101 R; 51/DIG. 32; 90/13.4
[58] Field of Search .......... 51/33 W, 50 PC, 101 R, 51/281 R, 281 C, DIG. 32; 90/13.4; 82/1.3, 1.5

[56] References Cited
U.S. PATENT DOCUMENTS

| 3,693,297 | 9/1972 | Cann | 51/101 R X |
| 3,750,345 | 8/1973 | Kolesar | 51/101 R |
| 3,757,474 | 9/1973 | Pedersen | 51/DIG. 32 |
| 3,816,996 | 6/1974 | Uhtenwoldt | 51/101 R |
| 3,828,481 | 8/1974 | Uhtenwoldt | 51/101 R |
| 3,834,084 | 9/1974 | Sakane | 51/101 R |
| 3,902,278 | 9/1975 | Uhtenwoldt | 51/101 R X |
| 3,948,144 | 4/1976 | Nagano | 51/DIG. 32 |

Primary Examiner—Al Lawrence Smith
Assistant Examiner—Nicholas P. Godici
Attorney, Agent, or Firm—Karl W. Flocks

[57] ABSTRACT

A cam machining apparatus are arranged such that: in a cam machining tool, oscillating motion is rendered between a work piece and a rotating tool in a manner that the center of the rotating tool stays on the normal line at a working point where the rotating tool and the work piece contact each other without making the working point shift, so that a cam can be machined with high accuracy of working without the cam contour being deformed even if the diameter of tool is changed, uniform finishing can be rendered along all the circumference of the cam face by keeping the speed of working substantially constant along all the circumference of the cam face, whereby high working accuracy can be obtained.

5 Claims, 26 Drawing Figures

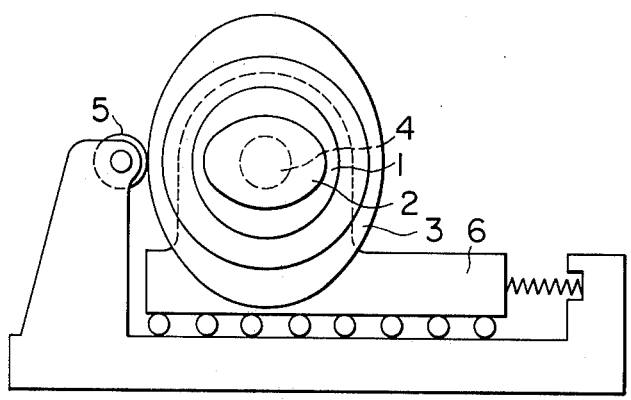
FIG. 1 PRIOR ART
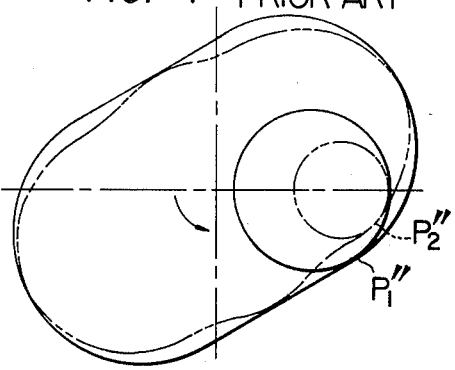
FIG. 4 PRIOR ART
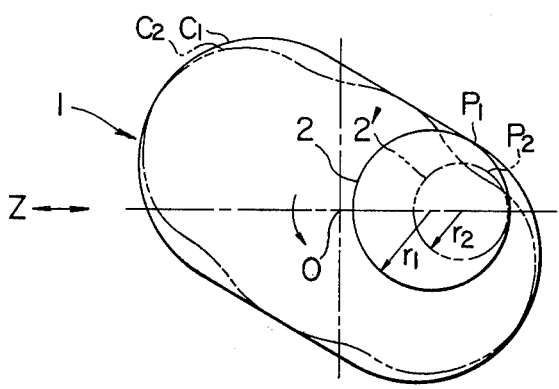
FIG. 2 PRIOR ART
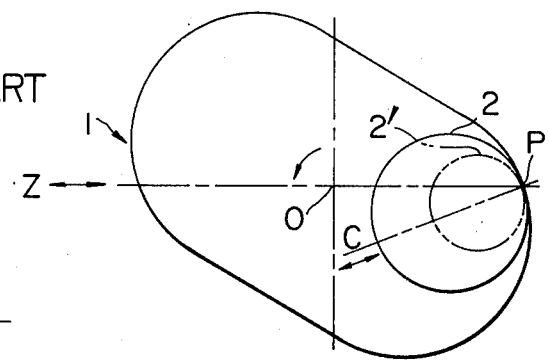
FIG. 5
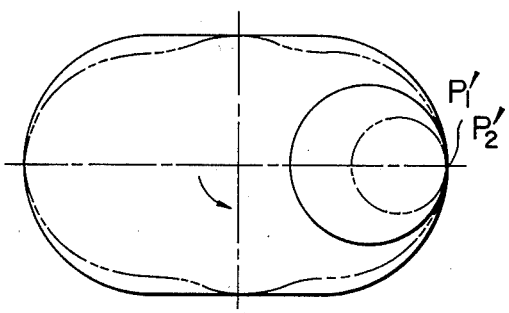
FIG. 3 PRIOR ART
FIG. 6
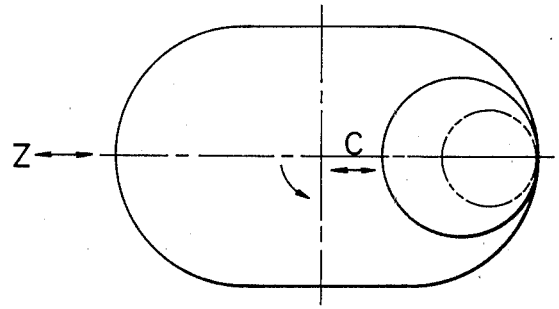
FIG. 7
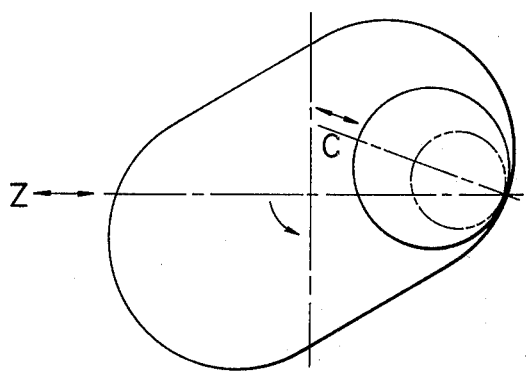

CAM MACHINING APPARATUS

BACKGROUND OF THE INVENTION

This invention relates to a cam machining apparatus, and more particularly it is concerned with a cam machining tool characterized in that: in a cam machining tool, a cam can be machined with high accuracy of working without the cam contour being deformed even if the diameter of the tool is changed, uniform finishing can be rendered along the circumference of the cam face by keeping the speed of working substantially constant along all the circumference of the cam face, thereby attaining high accuracy of working.

In the cam machining tools, such as a grinding machine and a milling machine, of the prior art, there has been a shortcoming that in the case of machining an internal cam or an external cam, the face of said cam tends to be deformed by the shift of the point of working, i.e., the point where the tool contacts the work piece, due to the change in the diameter of the tool. In addition, as the point of working shifts momentarily, the speed of working changes considerably, so that uniform finishing could not be obtained along all the circumference of the cam face.

SUMMARY OF THE INVENTION

The object of the present invention is to provide an apparatus, wherein a cam can be machined with high accuracy of working without the cam contour being deformed even if the diameter of the tool is changed, and uniform finishing can be rendered along all the circumference of the cam face by maintaining the speed of working substantially constant along all the circumference of the cam face, whereby high accuracy of working can be attained.

BRIEF DESCRIPTION OF THE DRAWINGS

FIG. 1 is a view showing mechanism of the cam machining method of the prior art;

FIGS. 2 through 4 are views showing the relationship between the work piece and the rotating tool according to the prior art;

FIGS. 5 through 7 are views showing the relationship between the work piece and the rotating tool according to the present invention;

FIGS. 1 through 4 illustrate the prior art, with FIG. 1 being a view of mechanism showing the method of machining a cam according to the prior art. 1 designates a work piece, in which interior a cam is formed by machining, 2 a rotating tool for machining an internal cam, and 3 a master cam for controlling the contour of the cam. The work piece 1 and the master cam 3 are solidly secured to a work spindle 4. As the work spindle 4 rotates, an upper work head 6 slides horizontally by means of the master cam 3 and a cam follower 5, to thereby generate a cam face.

FIGS. 2 through 4 show the relationship between the work piece 1 and the rotating tool 2 by the method described above. The work piece 1 is made to rotate and slide in the axial direction of Z, contacts at a point $P_1$ the rotating tool 2 secured in place and permitted only to rotate, and is machined. As the work piece 1 rotates, the contact point between the work piece and the rotating tool shifts from $P_1$, $P_1'$, $P_1''$ and so forth, so that a cam face $C_1$ is generated. When the diameter of the tool is changed (in the drawing, from $r_1$ to $r_2$), the change of the position of tool due to the change in the diameter of tool is corrected in the axial direction Z. Hence, if machining is performed by use of the same master cam as before, then the contact point between a rotating tool $2'$ having a radius $r_2$ and the work piece 1 shifts from $P_2$, $P_2'$, $P_2''$ and so forth, and the cam face thus machined becomes $C_2$ which differs from the cam face $C_1$ machined by the rotating tool 2 in contour. For this reason, heretofore there has been necessity for selecting a master cam matching the diameter of a tool. Particularly, the range of diameters of a usable grinding wheel has been considerably limited with the grinder, which proved to be uneconomical, and it has been impossible to attain highly efficient, heavy grinding. Additionally, since the contact point between the work piece 1 and the rotating tool 2 changes continually, the working speed along all the circumference of the working face changes considerably and a uniformly finished face could not be attained. As the working speed changes, cutting force continually and considerably changes, chattering tends to take place, and heavy cutting and heavy grinding could not be attained. Additionally, as shown in FIG. 16, there has been another cam machining method, by which the standard diameter of the tool was predetermined and a tool used was pivoted on the center of said standard tool and oscillated along the outer diameter of said standard tool in order to prevent the cam contour of the working face from being deformed due to the change in diameter of the tool. By this method, there have been such disadvantages that, although deformation of the contour of the working face due to the change in diameter of tool could be prevented, the working point continually changes and the working speed along all the circumference of the working face changes considerably and hence a uniformly finished face could not be obtained, cutting force was continually and considerably changed and chattering tended to take place with the change of working speed, and heavy cutting and heavy grinding could not be attained. Furthermore, by this method, there has been a shortcoming that sometimes the tool did not work during its oscillation with the result that time was excessively consumed before finishing.

DESCRIPTION OF THE PREFERRED EMBODIMENT

According to the present invention, a work piece solidly secured to a work spindle rotatably mounted on a work head, when rotated, is slidable horizontally and crosswise (in the axial direction of Z) by means of a master cam mounted on the work spindle similarly to the work piece and a cam follower and a spring both mounted on a carriage. Further, the carriage is slidably movable with respect to a bed in the axial direction of Z to give a cut to the work piece. A tool is rotated by means of a tool spindle unit slidable in the axial direction of Z, and at the same time the tool is brought into contact with the work piece by sliding the tool spindle unit in the axial direction of Z irrespective of the diameter of tool. Additionally, in order to make said contact point to be a fixed point during work, the tool is so oscillated about the contact point that the center of the tool stays on the normal line at the contact point where the work piece has its cam face to be machined. Further, when the diameter of the tool changed and correction of the diameter of the tool is required, the tool is moved in the direction of said normal line for correction (Hereinafter, this is expressed that the direction of correction points to the working point, and at the same time the direction of the tool spindle unit sliding perpendicularly to the oscillating shaft is referred to as 'C' direction).

FIGS. 5 through 7 show the relationship between the work piece 1 and the rotating tool 2 by the working method according to the present invention. The work piece 1 is rotated and slid in the axial direction of Z by means of a master cam not shown. The rotating tool 2 is so oscillated about the contact point with the work piece 1, i.e., the working point P that the rotating tool 2 is rotated in association with the rotation of the work piece 1 in a manner that the direction of correction due to the change in the diameter of the tool constantly points to the contact point, i.e., the working point P.

Figure 8:
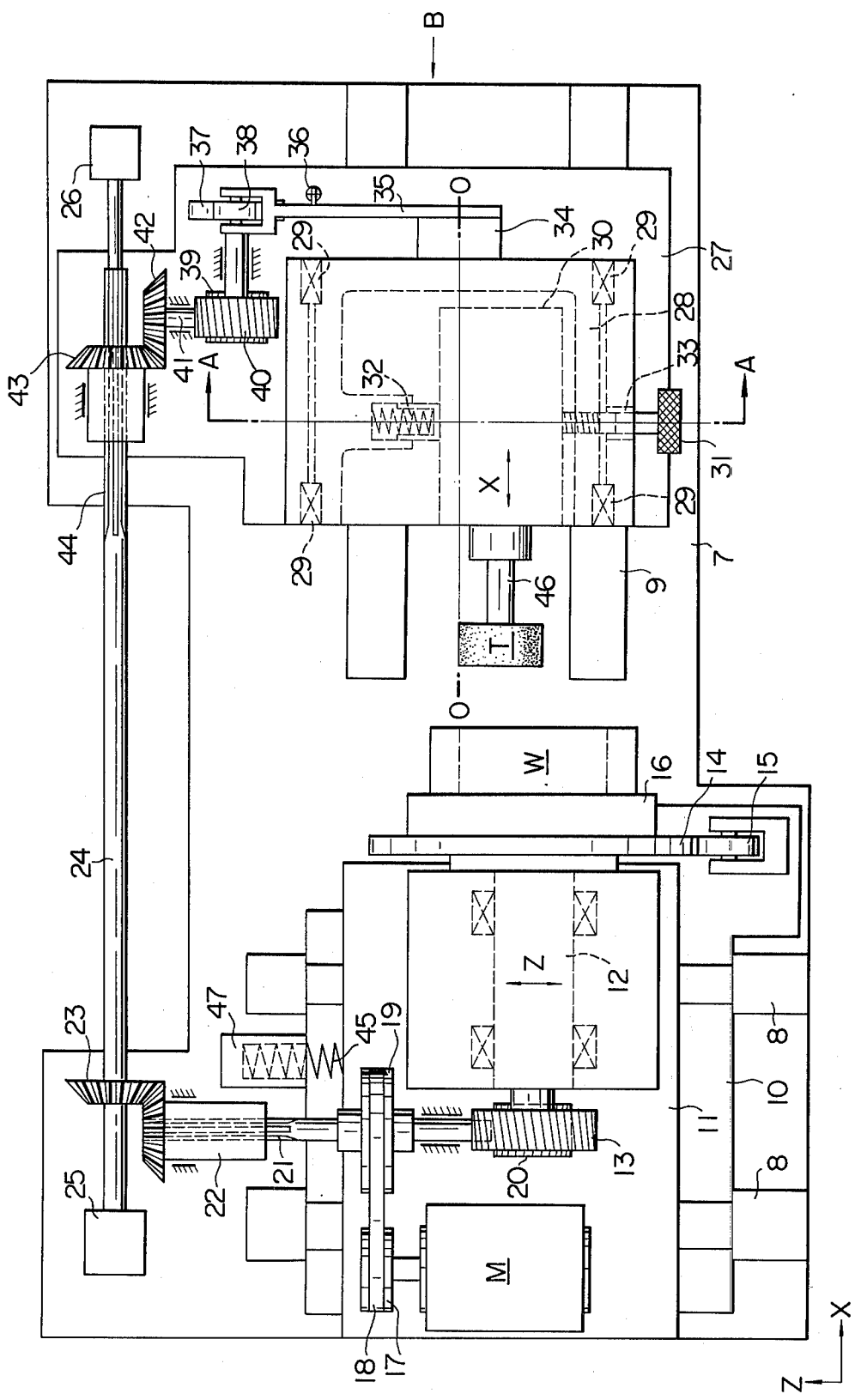
FIGS. 8 through 10 are views showing one embodiment of the cam machining apparatus according to the present invention, with FIG. 8 being a plan view, FIG. 9 being a cross-sectional view taken along the line A — A of FIG. 8, and FIG. 10 being a side view as viewed from the direction of an arrow B.
Figure 9:
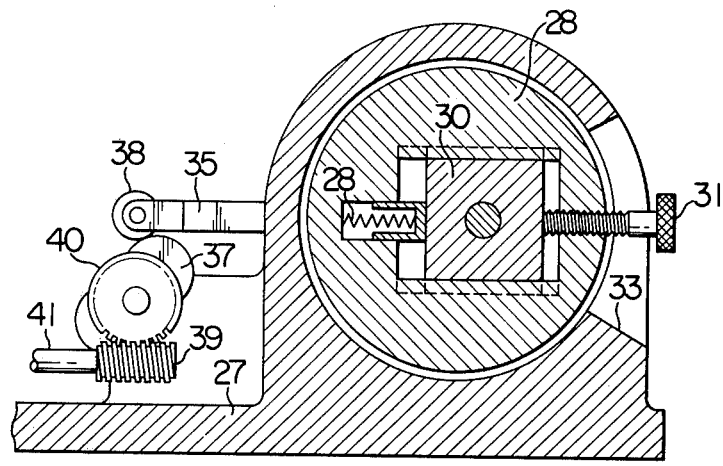
Figure 10:
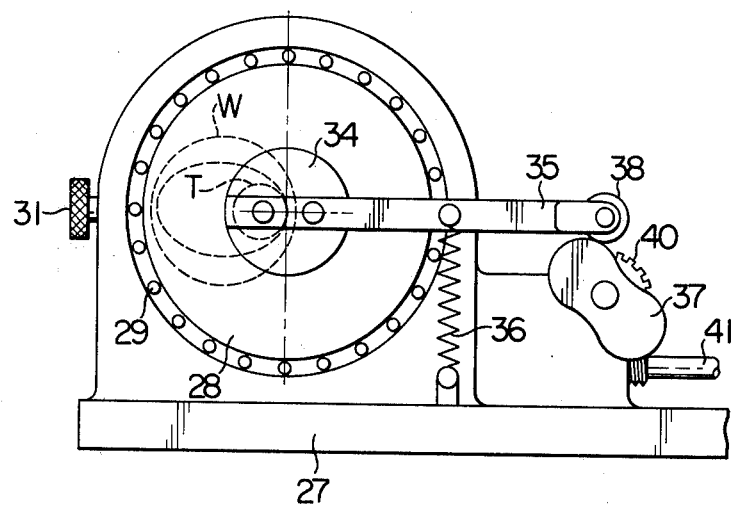

Next, an internal type grinder embodying the present invention is hereunder described with reference to FIGS. 8 through 10. 7 designates a bed. A carriage 10 is mounted slidably only in the axial direction of Z on a slide contact face 8 disposed on the bed 7, while a tool holder 27 is mounted slidably only in the axial direction of X on a slide contact face 9 thereof. Additionally, a work head 11 is mounted slidably in the axial direction of Z on the carriage 10. 12 is a work spindle rotatably mounted on the work head 11. The work spindle 12 has a worm wheel 13 for the work spindle fitted integrally a one end thereof and a face plate 16 for mounting a work piece W on the other end thereof, and further is provided with a master cam 14 integrally rotatably therewith. The carriage 10 is provided thereon with a cam follower 15 contacting one side of the master cam 14 and a spring shoe 47 receiving therein a compression spring 45 constantly urging the work head 11 against the cam follower 15. Since the outer periphery of the master cam 14 is constantly, pressingly attached to the cam follower 15 through the agency of said compression spring, the work head 11 slides in the axial direction of Z according to the contour of the outer periphery of master cam 14 with the rotation of master cam 14. M is a motor rotating the work piece W solidly secured to the work spindle 12, and drives the work spindle 12 through the medium of a pulley 17, a belt 18, pulley 19, worm gear 20 and worm wheel 13. A swivel member 28 is rotatably mounted on the tool holder 27 by means of bearings 29. The tool spindle unit 30 is mounted slidably perpendicularly to the axis of swivel (in the direction of C) on said swivel member 28. Additionally, the swivel member 28 is threadably coupled thereinto with a screw 31 for correction of tool diameter, and provided with a spring 32 at a portion in opposite relationship to said screw 31 for correction of tool diameter. The tool spindle unit 30 is constantly urged by said screw for correction of tool diameter and is controlled in the direction of C. In addition, of course, the screw 31 for correction of tool diameter can perform automatic correcting in association with a grinding wheel dressing mechanism. The tool holder 27 is notchedly provided with a slot 33 extending vertically for permitting the screw 31 for correction of tool diameter to oscillate. 46 is a tool spindle having a tool T, such for example as a grinding wheel, solidly secured to the forward end thereof. The swivel member 28 is provided at one end portion thereof with a boss 34, to which solidly secured is one end of an arm 35 which is provided at the other end with a cam follower 38. 36 is a spring mounted between said arm 35 and the tool holder 27 and urging the cam follower 38 against a cam 37 which will be described hereinafter. A shaft fitted with said worm gear 20 is notchedly provided at the other end with splines 21 which are coupled to a bevel gear 22 journally supported on the bed 7. 23 is a bevel gear solidly secured to a shaft 24 and engages said bevel gear 22. The shaft 24 is rotatably, journally supported by means of bearings 25 and 26. Additionally, the shaft 24 is notchedly provided with splines 44 which are coupled slidably in the axial direction into a bevel gear 43 journally supported on the tool holder 27. A shaft 41 of a bevel gear 42 engaging the bevel gear 43 journally supported on the tool holder 27 is notchedly provided with a worm gear 39 which is engaging a worm wheel 40 journally supported on the tool holder 27. 37 is an oscillating cam integrally, solidly secured to the shaft of the worm wheel 40, has the same driving power source as the work spindle, and is rotated in association with the rotation of the work spindle. Consequently, the swivel member 28 is oscillated about 0 through the medium of the cam follower 38 urged against the cam 37, and the tool T is oscillated about 0 accordingly. At this time, the rotating tool T is oscillated in a certain proportion to the rate of rotation of the work piece W through the medium of said gear train, and configurations and sizes of the cam 37, arm 35 and the like are so determined that the center of the rotating tool T constantly stays on the normal line at the contact point of the cam face to be machined. In addition, if the configuration of the work piece W is elliptical as shown in FIG. 10, then the master cam 14 is adapted to have the shift amount equal to that of the work piece and a configuration including two long diametral portions and two short diametral portions respectively. Additionally, the oscillating cam 37 is adapted to have a configuration including two convex portions and two concave portions respectively as shown in FIG. 10 so that necessity can be met for the rotating tool making two trips during one rotation of the work piece.

Firstly, the work piece W is solidly secured to the face plate 16, the master cam 14 for machining the cam face of said work piece W is solidly secured to the work spindle 12, and at the same time, the oscillating cam 37 is solidly secured to the shaft of the worm wheel 40 in identical phasic relation. Next, the tool T is solidly secured to the tool spindle 46, and by means of the screw 31 for correction of tool diameter. An adjustment is made such that the distance between the center 0 of swivel member 28 and the center of rotation of tool spindle 46 is equal to the radius of tool T. The driving force from the motor M rotates the work spindle 12, the master cam 14 and the work piece W through the medium of the pulley 17, belt 18, pulley 19, worm gear 20 and worm wheel 13, and at the same time, rotates the oscillating cam 37 in synchronism through the medium of the pulley 19, the bevel gear 22 coupled to the splines 21 of the shaft of the worm gear, the bevel gear 23 engaging said bevel gear 22, shaft 24, bevel gears 43 and 42, worm gear 39, and worm wheel 40. The rotation of oscillating cam 37 oscillates the swivel member 28 through the medium of the cam follower 38 and arm 35, and the rotating tool T oscillates about the center 0 of swiveling of the swivel member 28.

As the result of operations described above, the contact point between the work piece W and the rotating tool T, i.e., the working point, as viewed in the direction of an arrow B, is aligned with the center 0 of oscillation of the rotating tool T as shown in FIG. 10, said contact point (working point) P becomes a fixed point constantly during work, and the center of rotating tool T comes to be on the normal line to the contour of the cam to be machined at the contact point (working point) P.

In the embodiment described above, the rotating tool was oscillated so that the direction of correction of tool diameter could constantly point to the working point P of the work piece.

Figure 11:
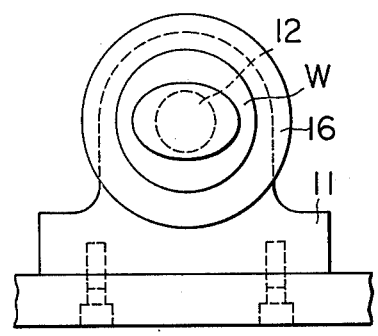
FIGS. 11 and 12 are views showing another embodiment of the cam machining apparatus according to the present invention, with FIG. 11 being a view of essential portions as viewed from the axial direction of the work spindle and FIG. 12 being a side view as viewed from the tool holder.
Figure 12:
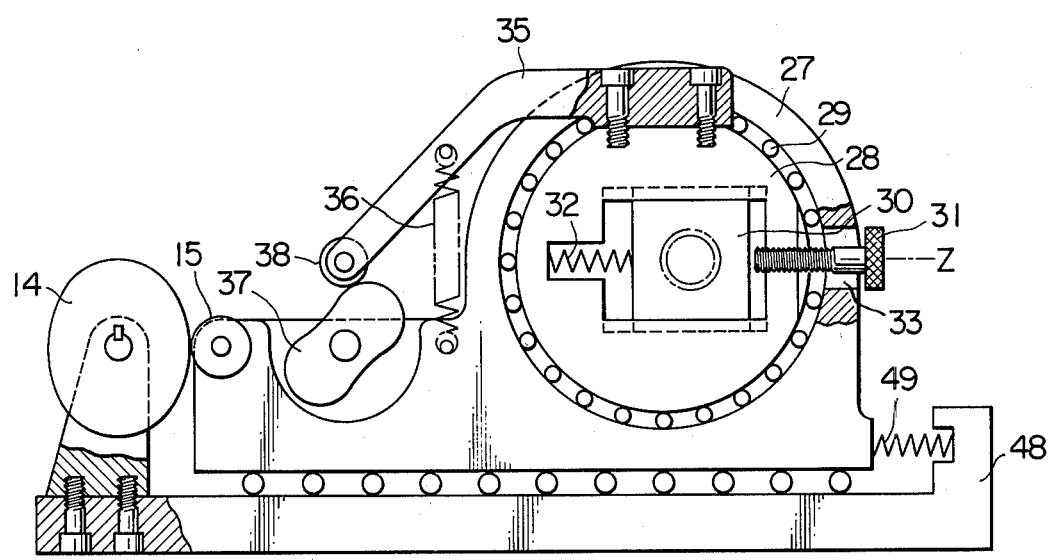

Additionally, as another embodiment shown in FIGS. 11 and 12, the work piece is rotated at a fixed position and the tool may be rendered rotation, crosswise motion by the master cam, and swiveling and oscillation by the oscillating cam. In other words, FIG. 11 shows a work head by the machining method of the invention, the main body of work head 11 is solidly secured to a table or a bed, and the work spindle 12 is rotatably mounted on the main body of work head 11. The work piece W is rotated together with the face plate 16 solidly secured to the work spindle 12. FIG. 12 is a view as viewed from the work head, wherein the tool holder 27 is slidably mounted on a carriage 48 for performing rapid traverse, in feed, etc. of the tool, and the cam follower 15 is urged against the master cam 14 mounted on the carriage 48 by means of a spring 49. Additionally, the swivel member 28 is rotatably, oscillatingly movably mounted on the tool holder 27 by means of bearings 29. The tool spindle unit 30 is mounted slidably in the direction of C on the swivel member 28, and controlled in the axial direction of Z by means of a spring 32 and screw 31 for correction of tool diameter. The arm 35 solidly secured to the swivel member 28 is provided at the forward end thereof with the cam follower 38. 37 is the oscillating cam rotatably mounted on the tool holder 27. By rotating the oscillating cam 37 with said cam follower 38 and oscillating cam 37 being constantly in contact with each other by means of the spring 36, the swivel member 28 is oscillated. Then, the master cam 14 and oscillating cam 37 are rotated in synchronsim with the work piece W in the same manner as in the embodiment described above. As a still further embodiment shown in FIG. 13, in the work head portion, such arrangement may be made that the master cam 14 be mounted on the carriage 10 instead of the work head 11, the cam follower 15 contacting the master cam 14 be mounted on the work head 11, and the master cam 14 be rotated in synchronsim with the rotation of work spindle 12.

Figure 13:
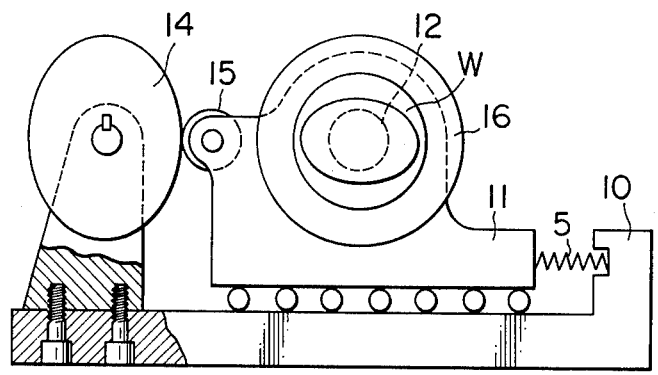
FIG. 13 is a side view of essential portions of a still other embodiment of the present invention.
Figure 14:
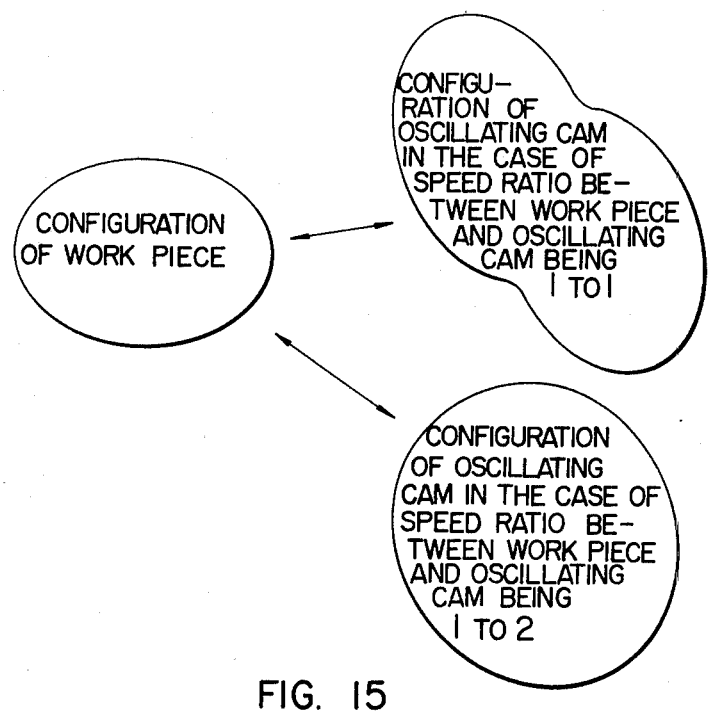
FIG. 14 is an explanatory view of the relationship between the contours of the work piece and the oscillating cam in the case of machining by the method according to the present invention.

In addition, if the cam face of the aforesaid work piece has a configuration which can be angularly divided into two or three equal parts, then the configuration of the oscillating cam can be simplified by making the rotation number of the oscillating cam into two or three times of the rotation number of the work spindle. For example, if the configuration of the work piece is elliptical as shown in FIG. 14, the rotating tool is required to make two trips of oscillating motion during one rotation of the work piece 1, and accordingly the oscillating should have a configuration including two convex portions and two concave portions. However, in this case, if the oscillating cam is rotated at a speed twice as fast as that of the work piece, then the configuration of the oscillating cam can be simplified to have only one convex portion and one concave portion. Additionally, as shown in FIGS. 12 and 13, in the case of the master cam being mounted on a spindle other than the work spindle, it is possible to make the configuration of the master cam simplified.

Figure 15:
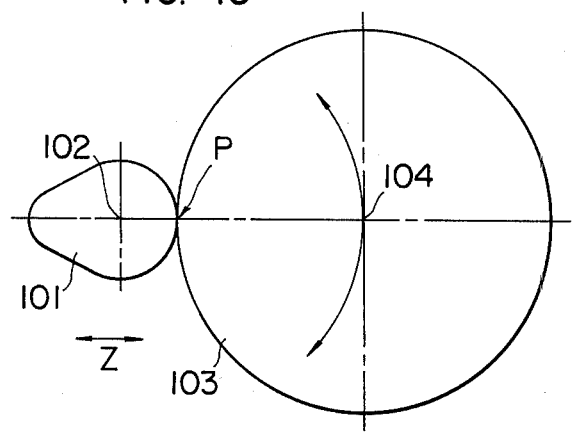
FIG. 15 is a view showing the relationship between the work piece and the rotating tool in the case of machining the external cam face by the method according to the present invention.
Figure 16:
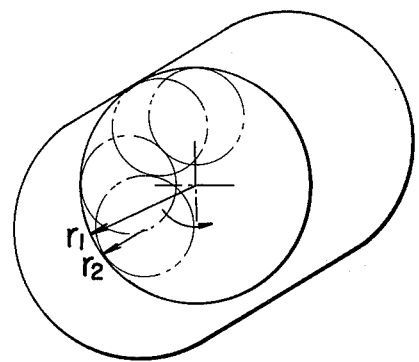
FIG. 16 is a view showing an example of the machining method of the prior art.
Figure 18:
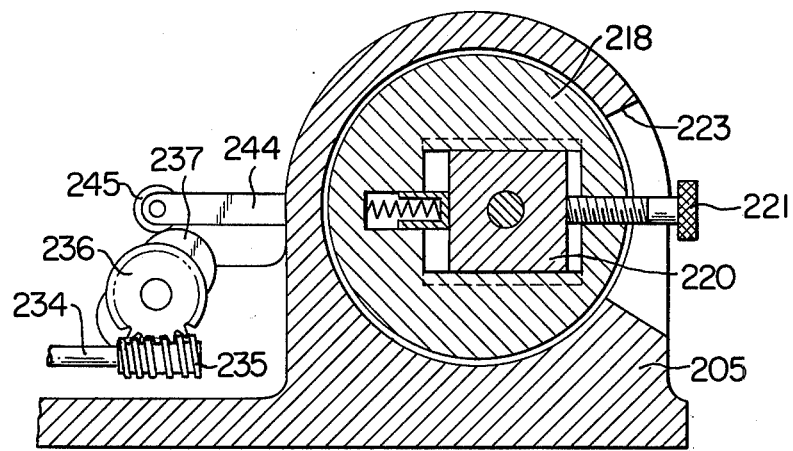
FIG. 18 is a cross-sectional view of the tool holder portion, which is taken along the line A — A of FIG. 17.
Figure 19:
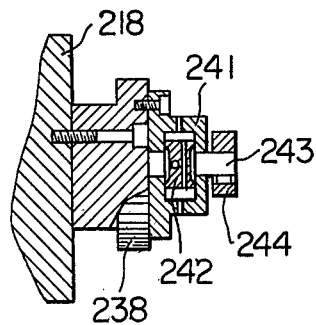
FIG. 19 is a cross-sectional view of the portion on which a rotary servo-valve is mounted.
Figure 20:
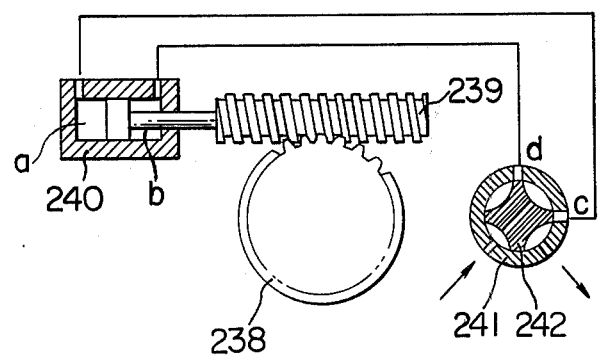
FIG. 20 is an explanatory view of operation of the rotary servo-valve.

The machining method of an internal cam has been described so far. The machining method similar to the above can be applied to an external cam. More specifically, referring to FIG. 15, a work piece 101 is, while rotating about the center 102 of rotation of the work piece 101, moved in the direction of Z by means of a master cam (not shown). A tool 103 is rotated about the center 104 of rotation, and said center of rotation is oscillated about the cutting point P. Oscillation of said tool is controlled by an oscillating cam rotated in synchronism with the rotation of work piece in the same manner as the aforesaid machining of internal cam. In feed can be made by the tool holder with the lower work head being solidly secured to the bed.

According to the present invention, even if the diameter of the tool is changed, the cam contour of the work piece will not change, and it is not necessary to select a master cam matching the diameter of the tool. Additionally, particularly with grinders, the range of diameters of usable grinding wheels is not limited and hence not only highly efficient heavy grinding and high speed grinding can be attained but also there is no need to replace the grinding wheel even if the diameter of the grinding wheel becomes smaller. Hence, the number of work pieces to be machined per grinding wheel can be increased greatly, thus reducing the cost of machining. Additionally, since the contact point between the work piece and the tool becomes a fixed point, the change in machining speed results only from the cam contours, and the change in machining speed becomes relatively small, so that a uniformly finished face can be obtained.

Furthermore, it becomes possible to make the configurations of oscillating cam and master cam simplified, thereby facilitating the production of cams.

Figure 17:
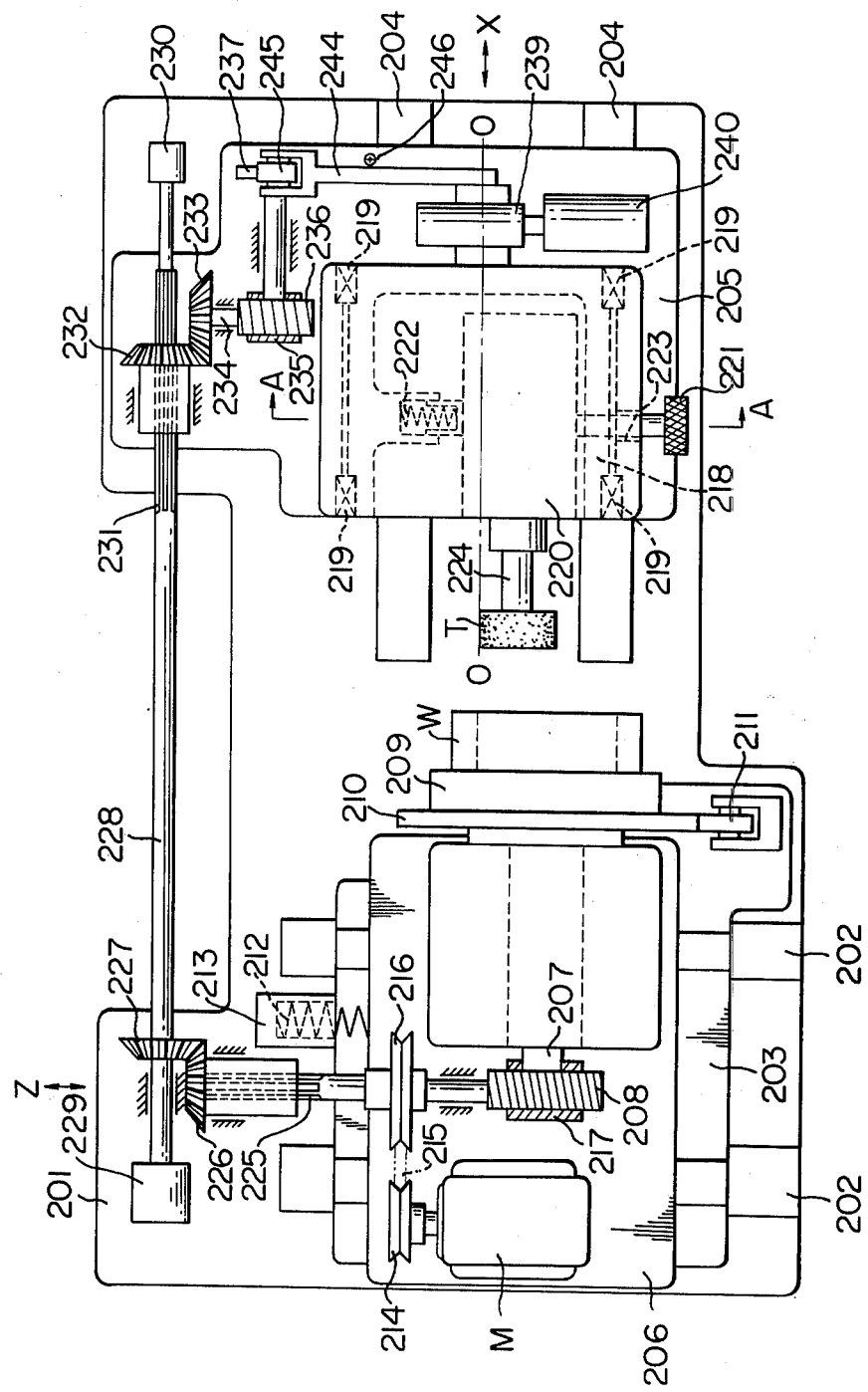
FIG. 17 is a plan view of an embodiment in which a master cam mounted on a main spindle and an oscillating cam mounted on a tool holder are mechanically rotated in synchronism.

Referring to FIG. 17, 201 designates a bed, and a lower work head 203 is mounted slidably perpendicularly to the axial line of the work spindle, i.e., in the axial line of Z only on the slide contact face 202 of the bed 201, while a tool holder 205 is mounted slidably only in the axial line of the work spindle, i.e., in the axial line of X on the slide contact face 204 of the bed. Additionally, a work head 206 is mounted slidably in the axial direction of Z on the lower work head 203. 207 is a work spindle rotatably mounted on the work head 206, provided integrally at one end thereof with a worm wheel 208 for the work spindle, provided at the other end with a face plate for mounting a work piece W, and further has a master cam 210 integrally, rotatably secured thereto. The lower work head 203 is provided thereon with a cam follower 211 contacting one side of a master cam 210 and a spring shoe 213 receiving a compression spring 212 constantly urging the work head 206 against the cam follower 211. The outer periphery of the master cam 210 is constantly urged against the cam follower 211 through the agency of said compression spring. Hence, the work head 206 slides in the axial direction of Z according to the contour of outer periphery of master cam 210 with the rotation of master cam 210. M is a motor rotating the work piece W solidly secured to the work spindle 207, and drives the work spindle 207 through the medium of a pulley 214, belt 215, pulley 216, worm gear 217 and worm wheel 208. A swivel member 218 is rotatably mounted on the tool holder 205 by means of bearings 219. A tool spindle unit 220 is mounted slidably horizontally (in the axial direction of Z) on said swivel member 218. Additionally, the swivel member 218 is threadably coupled thereinto with a screw 221 for correction of tool diameter, and provided at a portion in opposite relation to said screw 221 for correction of tool diameter with a spring 222. The tool spindle unit 220 is constantly urged by said screw for correction of tool diameter to be controlled in the axial direction of Z. In addition, of course, the screw 221 for correction of tool diameter 221 (not shown) can perform automatic correction in association with a grinding wheel dressing mechanism. The tool holder 205 is notchedly provided with a slot 223 extending vertically for permitting the screw 221 for correction of tool diameter to oscillate. 224 is a tool spindle having a tool T, such for example as a grinding wheel, solidly secured to the forward end thereof. A shaft for mounting said worm gear 217 is notchedly provided at the other end with splines 225 which are coupled to a bevel gear 226 journally supported on the bed 201. 227 is a bevel gear solidly secured to a shaft 228 and engages said bevel gear 226. The shaft 228 is rotatably, journally supported by means of bearings 229 and 230. Additionally, the shaft 228 is notchedly provided with splines 231 which are coupled slidably in the axial direction to a bevel gear 232 journally supported on the tool holder 27. A shaft 234 of a bevel gear 233 engaging the bevel gear 232 journally supported on the tool holder 205 is notchedly provided with a worm gear 235 engaging a worm wheel 236 journally supported on the tool holder 205. 237 is an oscillating cam integrally, solidly secured to the shaft of the worm wheel 236, has the same driving power source as the work spindle and is rotated in association with the rotation of the work spindle.

Solidly secured to the center portion of one end of said swivel member 218 is a gear 238 being engaged with a rack 239. The rack 239 is connected to the forward end of a piston rod of a hydraulic cylinder being fixed on the tool holder 205. Pressure oil feed into a left chamber $a$ and a right chamber $b$ of said cylinder 240 causes the swivel member 218 to rotate and oscillate by way of the rack 239 and gear 238, thus making the tool T to oscillate about the center 0 of swiveling of the swivel member. 241 is a main body of a rotary servo-valve concentrically secured to said gear 238, 242 a rotor portion swivelingly supported in said main body of the valve, and 243 an input shaft integrally provided on said rotor. Said main body of the valve has two communicating ports $c$ and $d$ for pressure oil in addition to an inflow port and an outflow port. Said communicating ports $c$ and $d$ are correspondingly communicated with said left and right chambers $a$ and $b$, respectively. 244 is an arm solidly secured to said input shaft, and rotatably provided at the forward end thereof with a cam follower 245 contacting said oscillating cam 237. 246 is a spring spreadingly provided between said arm 244 and the tool holder 205. The cam follower 245 is constantly urged against the oscillating cam 237 by means of said spring.

Next, description will be given of actions. Firstly, the work piece W is solidly secured to the face plate 209, and the master cam 210 for machining the cam face of said work piece W is solidly secured to the work spindle 207. Additionally, the oscillating cam 237 is solidly secured to the shaft of worm wheel 236 in identical phasic relation with the master cam. Next, the tool T is solidly secured to the tool spindle 224, and by means of the screw 221 for correction of tool diameter an adjustment is made such that the distance between the center 0 of the swivel member 218 and the center of rotation of the tool spindle 224 becomes equal to the radius of the tool T. The driving force from the motor M drives the work spindle 207, master cam 210 and work piece W through the medium of the pulley 214, belt 215, pulley 216, worm gear 217 and worm wheel 208, and at the same time, rotates the oscillating cam 237 in synchronism with the work spindle through the medium of the pulley 216, the bevel gear 226 threadably coupled to the splines 225 of the the shaft of worm gear, the bevel gear 227 engaging the bevel gear 226, bevel gears 232 and 233, worm gear 235, and worm wheel 236. The rotation of oscillating cam 237 causes the input shaft 243 of the rotary servo-valve to oscillate by way of the cam follower 245 and arm 244. When the oscillation causes two communicating ports $c$ and $d$ to open, feeding pressure oil through one of the communication ports into either one of the chambers $a$ and $b$ of cylinder 240, the rack thus moves to the left or right, causing the tool T to oscillate about the center 0 of the swiveling of the swivel member 218. At this time, the main body of rotary servo-valve 241 solidly secured to the gear 238 is rotated integrally with the gear 238, two communicating ports c and d of the main body are closed by means of the rotor 242, pressure oil feed into the cylinder 240 is interrupted, the rack 239 is stopped in moving, and the tool T is also stopped in oscillating.

Next, when the oscillating cam 237 is rotated still further, the arm 244 oscillates, the tool T oscillates, and the resulting rotation of the main body of the rotary servo-valve 241 causes the oscillation of tool T to stop. By repeating the aforesaid actuations, the tool T oscillates about the center 0 of swiveling of the swivel member 218 in a certain relation with the work spindle according to the rotation of the oscillating cam 237.

Figure 21:
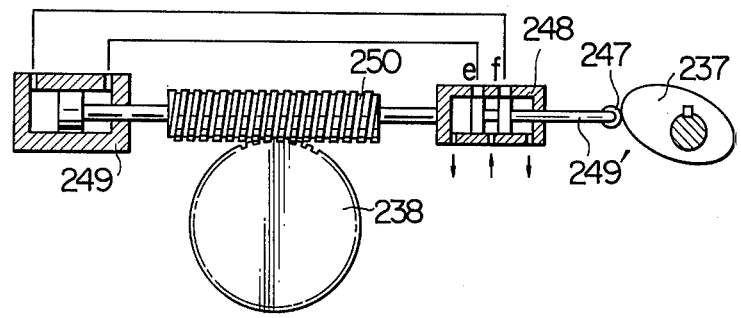
FIG. 21 is an explanatory view of operation of a direct acting spool valve for a hydraulic servo-valve.

FIG. 21 shows another embodiment in which a direct acting spool valve for hydraulic servo-valve is used in place of the rotary servo-valve in said internal type grinder. 247 is a cam follower contacting said oscillating cam 237 and rotatably mounted at the forward end of spool shaft 249 of a spool valve 248. The spool valve 248 is provided with two passageways e and f for pressure oil in addition to an inflow port and a discharge port, said two passageways e and f being communicated with left and right chambers of a cylinder 249 performing the same function as said cylinder 240. Additionally, a rack 250 performing the same function as said rack 239 is integrally connected to the main body of spool valve 248 and a piston rod of cylinder 249, and, by engaging a gear 238, performs the same operation as in the case of the rotary servo-valve.

Figure 22:
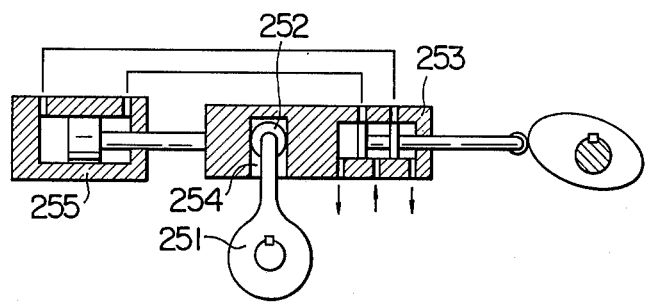
FIG. 22 is an explanatory view showing an example of use of a lever.

FIG. 22 shows a still other embodiment in which a lever is used in place of the rack and gear shown in FIG. 21. A lever 251 in place of the gear 238 is solidly secured to the gear mount portion of the swivel member 218, and a roller 252 is rotatably mounted at the forward end of said lever. Said roller 252 is couplingly inserted into a recessed portion 54 notchedly provided in the main body of spool valve 53 performing the same function as said spool valve 248, and at the same time, the main body of the spool valve is integrally connected to the piston rod of cylinder 255 performing the same function as said cylinder 240, and performs the operation similar to the case of the rack and gear.

Figure 23:
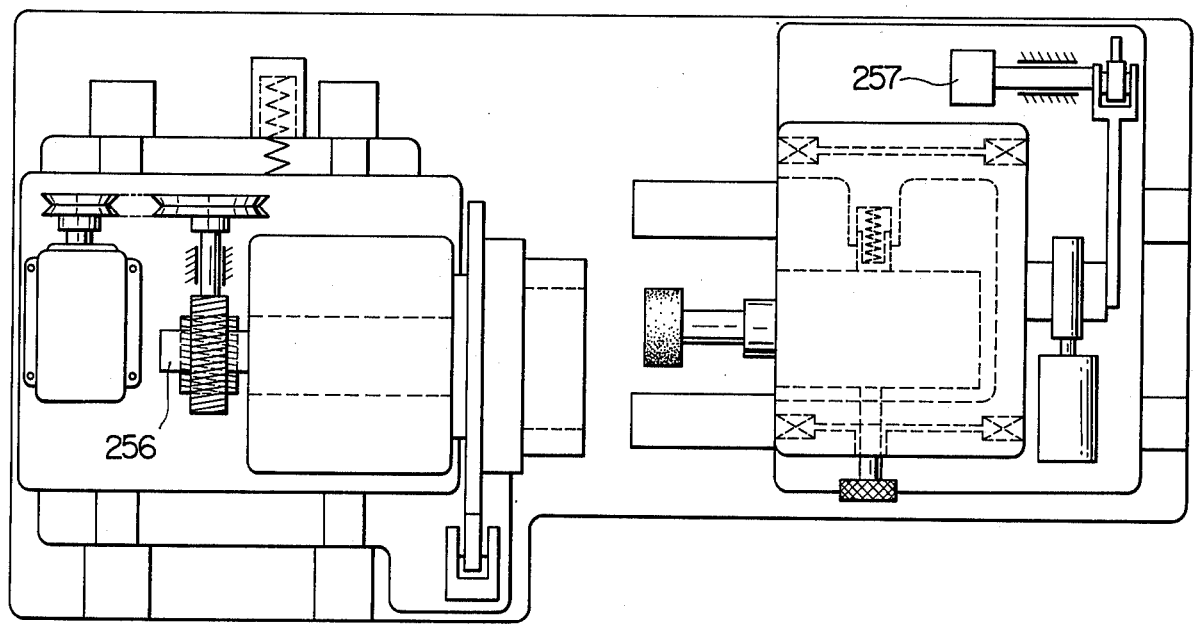
FIG. 23 is a plan view showing an embodiment in which a master cam and an oscillating cam are rotated in synchronism by use of a synchronous transmitter and a synchronous receiver.

FIG. 23 shows another embodiment where an electrical connecting method is used, in which a synchronous transmitter and a synchronous receiver are utilized for synchronization between the rotation of work spindle and that of oscillating cam, in place of the mechanical connecting mechanism. A synchronous transmitter 256 is provided at the rear end of the work spindle, and a synchronous receiver 57 is provided at the end of the shaft on which the oscillating cam is mounted. The oscillating cam is rotated in synchronism with the rotation of the work spindle. In addition, as medium for transmitting the rotation of the oscillating cam to the tool T, said rotary servo-valve spool valve, lever, etc. are used.

Figure 24:
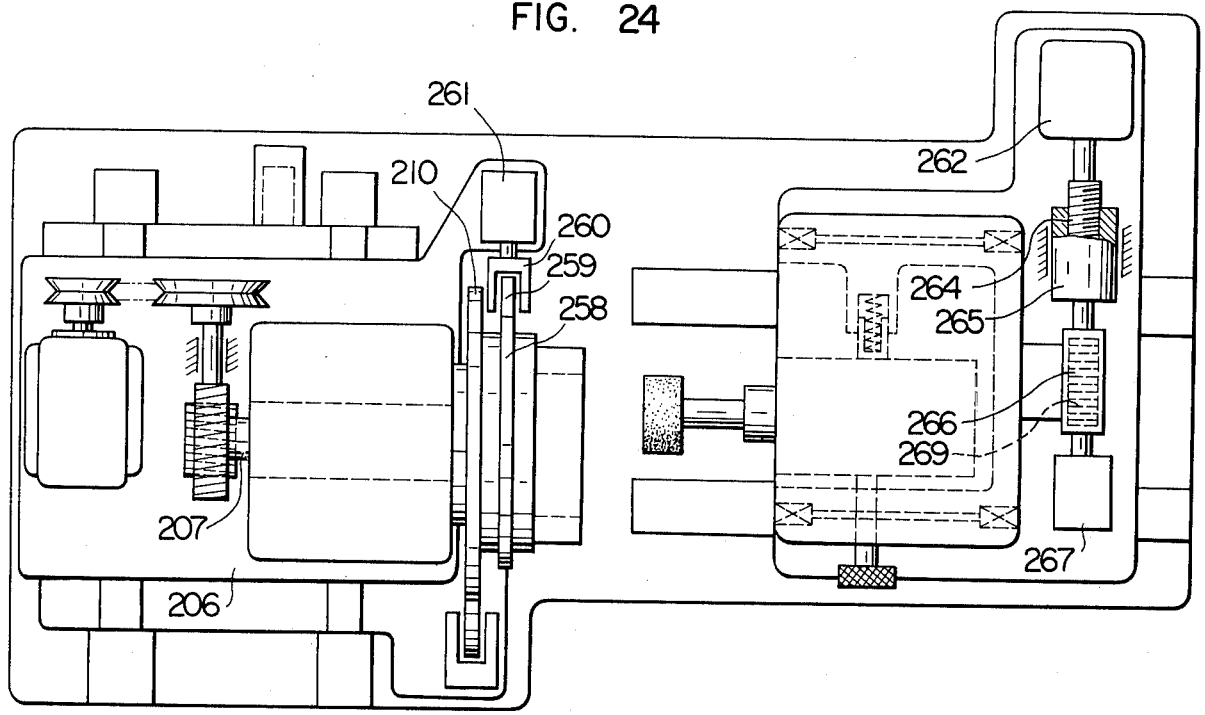
FIG. 24 is a plan view of an embodiment in which a tool is oscillated in accordance with an oscillating cam by use of differential transmitters.
Figure 25:
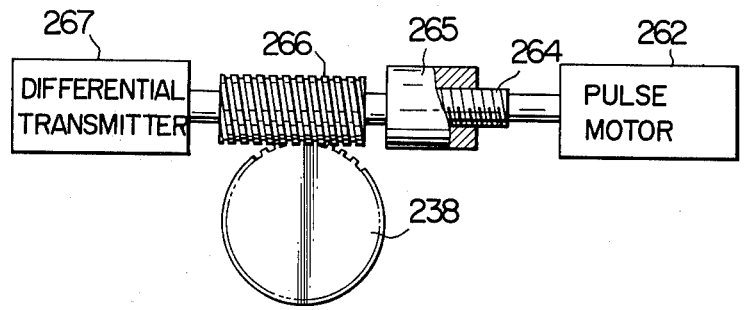
FIG. 25 is an explanatory view of operation in the case of oscillating a tool by use of differential transmitters.

FIG. 24 shows another embodiment in which differential transmitters are used to oscillate the tool in synchronsim with the rotation of the work spindle. 258 is an oscillating cam mounted on the work spindle 207 in identical phasic relation with the master cam 210. 259 is a cam follower constantly contacting said oscillating cam 58 rotatably mounted on a support arm 260 whose one end is pivotally supported on the work head, and oscillates in the axial direction of Z with the rotation of the work spindle 207. The work head 206 is provided at a position in opposite relationship to said oscillating cam 58 with a differential transmitter 261. A movable iron core of the differential transmitter is connected to said support arm 260, and signals are transmitted by the differential transmitter according to the oscillating motion of the support arm in the axial direction of Z. 262 is a pulse motor fixed on the tool holder 205, and rotated according to signals transmitted from a comparison operational circuit 263 which will be discussed hereinafter. The rotating shaft of the pulse motor is integrally provided at the forward end thereof with externally threaded portion 264 which is threadably coupled into internally threaded portion 265 unrotatably, journally supported. Said internally threaded portion 265 is integrally provided with a rack 266 engaging a gear 269 mounted at one end of the swivel member 218. 267 is a differential transmitter disposed in opposite relationship to the pulse motor 262 with respect to said gear 269 on the tool holder 205. Said rack 266 is connected to the movable iron core of the differential transmitter 267.

Figure 26:
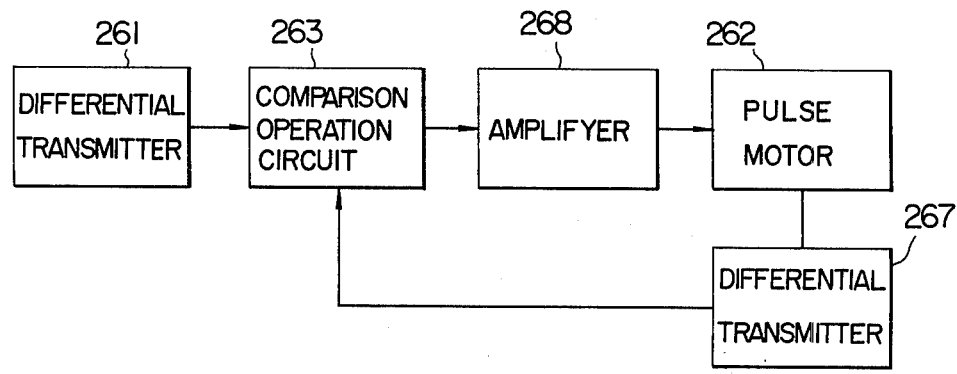
FIG. 26 is a block diagram in the use of differential transmitters.

FIG. 26 is a block diagram in the case that said differential transmitters and pulse motor are used. 263 is a comparison operational circuit which receives signals from the differential transmitters 261 and 267, and indicates the direction of rotation and rate of rotation to the pulse motor 262 according to the difference operationally calculated from said signals. 268 is an amplifier for amplifying the output of the comparison operational circuit 263 and sending same to the pulse motor 262.

Next, description will be given of actions. When the work spindle is rotated, causing the oscillating cam 258 to rotate, the movable iron core of the differential transmitter 261 is thus moved by way of cam follower 259 in the axial direction of Z, sending to the comparison operational circuit 263 a signal according to the configuration of the oscillating cam 258 from the differential transmitter 261. Upon receiving said signal and a signal of the present position of the differential transmitter, the comparison operational circuit 263 compares both signals, and sends a signal corresponding to the difference therebetween to the puulse motor 262. Then, the pulse motor 262 rotates in response to the signal sent from the comparison operational circuit 263. By this, the unrotatable, internally threaded portion 265 threadably coupled to the externally threaded portion 264 mounted at the forward end of the rotating shaft of pulse motor is moved in the axial direction of Z, and the rack 266 rotates the gear 269, causing the tool to oscillate. At the same time, the movable iron core of the differential transmitter 267 is moved, and the differential transmitter 267 sends to the comparison operational circuit a signal for eliminating the difference with the differential transmitter 261. Next, when the work spindle rotates, the pulse motor rotates in the similar manner so as to eliminate the difference between the differential transmitter 261 and 267, causing the tool to oscillate. In addition, it is possible to make the tool to oscillate by causing the spool valve to operate according to the difference in output between the differential transmitters 261 and 267.

As has been described above, according to the present invention, in transmitting the rotation of the oscillating cam as the oscillating motion of the tool, the driving power sources of the oscillating cam and of the oscillating motion of tool are separately provided and hence the mechanical connecting mechanism for synchronization of rotations can be simplified, or said connecting mechanism can be dispensed with by use of electrical synchronization. Thus, the present invention has such features that generally the apparatus can be improved in rigidity and in accuracy of response.

What is claimed is:

1. A cam machining apparatus wherein a rotating tool is used in performing work controlled by profiling of a master cam, characterized in that said apparatus comprises a work spindle rotatably mounted on a work head and adapted to be fitted with a work piece for rotation therewith at a predetermined number of rotations;

an oscillating cam mounted on a tool holder and rotating in a certain proportion with the rotation number of said work spindle;

a swivel member swiveling with the rotation of said oscillating cam;

a tool spindle unit having a rotating tool, provided on said swivel member and being slidable perpendicularly to the swiveling axis of swivel member;

a carriage supporting one of said work head and said tool for sliding movement perpendicular to the axis of said spindle;

a master cam being rotated in a certain proportion with the rotation of said work spindle, and relatively changing the distance between the axial line of said work spindle and the axial line of said rotating tool; and the rotating tool is constantly oscillated about the working point during work by sliding said tool spindle unit whereby the outer periphery of the rotating tool can be aligned with the center of swiveling of said swivel member;

said tool holder slidably moving perpendicularly to the axial line of the work spindle with respect to said carriage and said master cam being rotated in a certain proportion with the rotation of the work spindle is adapted to cause said tool holder to slide;

said master cam being rotated in a certain proportion with the rotation of the work spindle is mounted on said carriage and a cam follower contacting said master cam is mounted on the tool holder, thereby causing the tool holder to slidably move perpendicularly to the axial line of the work spindle with the rotation of said master cam.

2. A cam machining apparatus wherein a rotating tool is used in performing work controlled by profiling of a master cam, characterized in that:

said apparatus comprises a work spindle to be fitted with a work piece;

an oscillating cam being rotated in a certain proportion with the rotation of said work spindle by mechanical connecting means;

a swivel member disposed at a position in opposite relationship to said work spindle and controlled in swiveling by said oscillating cam;

a tool spindle unit having a driving power source for swiveling said swivel member and a rotating tool, provided on said swivel member and being slidable perpendicularly to the axis of swiveling of the swivel member;

a master cam being rotated in a certain proportion with the rotation number of said work spindle, and relatively change the distance between the axial line of said work spindle and the axial line of said rotating tool;

the rotating tool is oscillated about the generating line aligned with the swiveling axis of said swiveling member by swiveling and oscillating the swiveling member after aligning the generating line of the outer cylindrical periphery of the rotating tool with the swiveling axis of the swiveling member by sliding said tool spindle unit perpendicularly to the swiveling axis of the swiveling member; and when transmitting controlled swiveling to the swivel member, the oscillating cam is adapted to transmit its movement boosted by an hydraulic cylinder included as a part of said mechanical connecting means through a rotary servo-valve.

3. A cam machining apparatus wherein a rotating tool is used in performing work controlled by profiling of a master cam, characterized in that:

said apparatus comprises a work spindle to be fitted with a work piece;

an oscillating cam being rotated in a certain portion with the rotation of said work spindle by mechanical connecting means;

a swivel member disposed at a position in opposite relationship to said work spindle and controlled in swiveling by said oscillating cam;

a tool spindle unit having a driving power source for swiveling said swivel member and a rotating tool, provided on said swivel member and being slidable perpendicularly to the axis of swiveling of the swivel member;

a master cam being rotated in a certain proportion with the rotation mnumber of said work spindle, and relatively change the distance between the axial line of said work spindle and the axial line of said rotating tool;

the rotating tool is oscillated about the generating line aligned with the swiveling axis of said swiveling member of swiveling and oscillating the swiveling member after aligning the generating line of the outer cylindrical periphery of the rotating tool with the swiveling axis of the swiveling member by sliding said tool spindle unit perpendicularly to the swiveling axis of the swiveling member; and when transmitting controlled swiveling to the swivel member, the oscillating cam is adapted to transmit its movement boosted by an hydraulic cylinder included as a part of said mechanical connecting means through a spool valve.

4. A cam machining apparatus wherein a rotating tool is used in performing work controlled by profiling of a master cam, characterized in that:

said apparatus comprises a work spindle to be fitted with a work piece;

an oscillating cam being rotated in a certain proportion with the rotation of said work spindle, or the rate of movement of which is transmitted by electrical connecting means;

a swivel member disposed at a position in opposite relationship to said work spindle and controlled in swiveling by said oscillating cam;

a tool spindle unit having a driving power source for swiveling said swivel member and a rotating tool, provided on said swivel member and being slidable perpendicularly to the axis of the swivel member; and a master cam being rotated in a certain proportion with the rotation of said work spindle, and relatively change the distance between the axial line of said work spindle and the axial line of said rotating tool;

the rotating tool is oscillated about the generating line aligned with the swiveling axis of said swiveling member by swiveling and oscillating the swiveling member after aligning the generating line of the outer cylindrical periphery of the rotating tool with the swiveling axis of the swiveling member by sliding said tool spindle unit perpendicularly to the swiveling axis of the swiveling member; and a synchronous transmitter is mounted on the work spindle and a synchronous receiver on the shaft of the oscillating cam as electrical connecting means for rotating the oscillating cam in a certain proportion with the rotation of the work spindle.

5. A cam machining apparatus wherein a rotating tool is used in performing work controlled by profiling of a master cam, characterized in that:

said apparatus comprises a work spindle to be fitted with a work piece;

an oscillating cam being rotated in a certain proportion with the rotation of said work spindle, or the rate of movement of which is transmitted by electrical connecting means;

a swivel member disposed at a position in opposite relationship to said work spindle and controlled in swiveling by said oscillating cam;

a tool spindle unit having a driving power source for swiveling said swivel member and a rotating tool, provided on said swivel member and being slidable perpendicularly to the axis of the swivel member; and a master cam being rotated in a certain proportion with the rotation of said work spindle, and relatively change the distance between the axial line of said work spindle and the axial line of said rotating tool; and the rotating tool is oscillated about the generating line aligned with the swiveling axis of said swiveling member by swiveling and oscillating the swiveling member after aligning the generating line of the outer cylindrical periphery of the rotating tool with the swiveling axis of the swiveling member by sliding said tool spindle unit perpendicularly to the swiveling axis of the swiveling member; and differential transmitters are provided at a section for taking out the rate of movement of the oscillating cam and a section for controlling the rate of swiveling of the swivel member, respectively, as the electrical connecting means for transmitting the rate of movement of the oscillating cam to the swivel member, and the swivel member is adapted to swivel so that the signals of both differential transmitters can act correspondingly.

* * * * *